Jan. 8, 1963

R. W. ASTHEIMER

NIPKOW SCANNER

Filed Feb. 6, 1961

3,072,740

INVENTOR.
ROBERT W. ASTHEIMER

BY

ATTORNEY

United States Patent Office 3,072,740

Patented Jan. 8, 1963

3,072,740

NIPKOW SCANNER

Robert W. Astheimer, Westport, Conn., assignor, by mesne assignments, to the United States of America as represented by the Secretary of the Army

Filed Feb. 6, 1961, Ser. No. 87,414

5 Claims. (Cl. 178—7.1)

This invention relates to scanning mechanisms and more particularly to scanners utilizing reticles to produce a mechanical scan.

The transformation of optical images into electrical signals is normally effected by television cameras of the iconoscope or image orthicon type. Here an optical image is projected on the whole face of a screen and this is scanned into a series of lines by moving an electronic beam. Where this type of instrument is suitable it is nearly ideal but unfortunately there are certain uses where the television camera type of instrument is not suitable. One such use is in operations, for example military operations, where a high resistance to shock is necessary. Another situation is where the nature of the radiation is such that television cameras cannot effectively be used, for example, in the infrared where television cameras extend only a very short way into the very near infrared. Another application is where measurements with large dynamic range are required. Image orthicons, vidicons and iconoscopes have very limited dynamic range while a photo-multiplier used in an optical mechanical scanner can operate over a dynamic range of one million to one or more. It is with instruments which are not suitable for television cameras that the present invention deals.

Very early television experiments, long before the practical television of today, employed mechanical scanning. One of the earliest proposals was the so-called Nipkow disc in which a series of holes arranged in one or more spirals resulted in moving the small hole aperture across a given field. The present invention belongs to the mechanical scanning class of which the Nipkow disc was typical. However, vastly increased resolution is obtainable with equipment of usable size. The invention will be described in connection with a device for observing small radiant sources such as the re-entry of nose cones and the like. The use to which the invention is put actually forms no part of the invention, and this typical use is mentioned merely to illustrate the operation of the invention.

If it is necessary to observe a certain field of view this field could theoretically be scanned with an ordinary Nipkow disc. But if a resolution by a large number of lines, say 100 lines, is required an ordinary Nipkow disc would have to have a spiral with 100 widely spaced holes and the size of the disc would be enormous, a number of feet in diameter. Such an instrument is not practical for most purposes and is completely out of the question for equipment which has to be portable and light. The present invention accomplishes high resolution with small discs, for example, 5" discs and opens the mechanically scanned instrumentation of this type to entirely new practical fields.

Essentially the present invention employs a double disc, the two discs preferably rotating at different speeds, one disc containing a single continuous spiral slot and the other a series of radial slots. This combination of two small discs with light and simple drive means give an accuracy that would require an immense instrument if an ordinary Nipkow scanner were employed. The invention will be clear from a description of a typical instrument in connection with the drawings in which.

Figure 1:
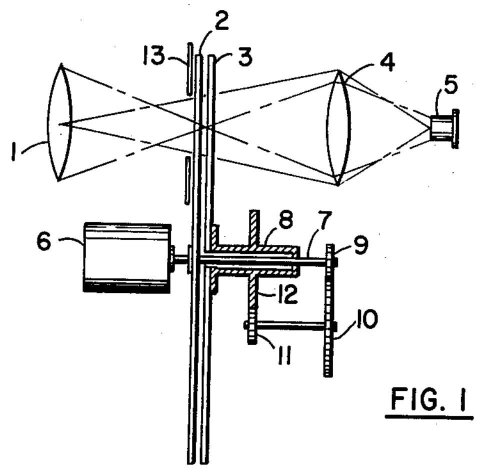
FIG. 1 is a vertical section through a typical scanner.

The instrument as shown in FIG. 1 is provided with collecting optics illustrated in the form of an objective 1 which constitutes the entrance pupil of the system, a window or field stop 13, two rotating reticle discs 2 and 3, a field lens 4 and a detector 5 which may be a photomultiplier tube when the radiations employed are within the region of its satisfactory operation or other photoconductors or detectors of radiation of suitably short time constant. The detector transforms radiation into electrical signal which is processed by conventional electronic circuits (not shown).

Disc 2 is driven by a motor 6 having a shaft 7. The disc is direct connected and turns at motor speed, for example, 6,000 r.p.m. The second disc 3 is provided with a central opening through which the shaft 7 extends and is itself mounted on a sleeve 8. The shaft 7 extends through the sleeve and is provided with a small gear 9 meshing with a larger gear 10 on a counter shaft which in turn drives the sleeve 8 through gears 11 and 12. The gearing results in both discs turning in the same direction but disc 3 turns at only one-tenth the r.p.m. of disc 2, or in the illustration 600 r.p.m.

Figure 2:
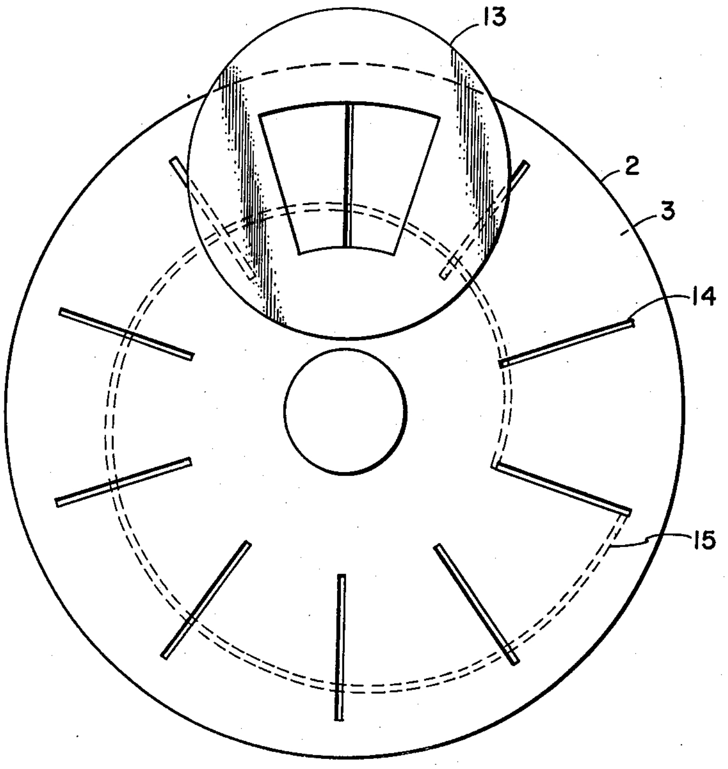
FIG. 2 is an elevation of the two scanning discs and aperture window.

The nature of the discs is shown in FIG. 2 which is an elevation of the aperture window and the two discs. It will be seen that the aperture window is in a mask and is shaped so that the field is curved concentric with the center of rotation of the discs. Disc 2 is provided with ten equally spaced radial slots 14, the spacing being the same as the dimensions of the aperture window. These slots are transparent to the radiation selected. In the case of visible light or the very near infrared the disc may be a glass disc and the slots be clear glass with the rest of the disc opaque. For operation in the farther infrared or in the ultraviolet the slots may actually be openings. Disc 3 which is underneath and turns at one-tenth the speed of disc 2 is provided with a single, spiral slot 15. Again where the radiation is suitable this may be a glass disc with a spiral slot clear and the rest of the disc opaque.

Disc 2 is rotating at 100 r.p.s. and, therefore, the intersection of the radial slots 14 and the spiral slot 15, which is a small square aperture, sweeps across the aperture window 1,000 times a second. The slower turning disc 3 with a spiral slot causes the scan to be in the form of a series of 100 lines producing a scanning raster. In a typical instrument the slots may be 0.01" and, therefore, there are 100,000 elements per second. If a single Nipkow disc were used the spiral would have to have 100 holes spaced an inch and would be several feet in diameter resulting in an instrument so bulky as to be useless for operation.

The instrument of the present invention is not concerned as such with the particular optical radiation used. Where visible light is acceptable the detector may be a photomultiplier. In the near infrared photodetectors such as germanium, lead sulfide, indium antimonide and the like may be used, cooled if desired for greater sensitivity to longer infrared radiation. As a matter of fact the nature of the detector is determined only by two factors, one is its responsiveness to the optical radiation used and the other is a sufficiently short time constant for the resolution desired. In the case of the instrument described the detector requires a 10 $\mu$sec. time constant detector. Ordinary thermistor bolometers for use in the far infrared are not fast enough to give such a resolution. However, there have been developed quite recently thermistor detectors of very thin layers of germanium or silicon which have time constants of a few microseconds. With these new thermistor detectors it is possible to design instruments which will operate anywhere in the infrared even at extremely long wavelengths, an advantage for certain operations. In many cases much shorter wavelength radiations are used an this is advantageous as more sensitive detectors are available such as photomultiplier tubes. In general the present invention is not concerned at all with the use of particular wavelength band of optical radiation or a particular detector except that the two must match each other. Similarly the collecting optics may be of standard design, which is an advantage. In the visible light and very near infrared dioptric collecting optics permit an extremely compact instrument. In the further infrared optics of germanium and silicon may be used or catoptric collecting systems may be employed. In general the present invention is not concerned at all with the particular design of the collecting optics. They are simply a means of imaging a desired field of view onto the rotating reticle discs and then onto the detector. The fact that any kind of standard collecting optics may be used in an advantage of the present invention and adds greatly to its flexibility.

The field lens 4 performs a valuable function, particularly where precise measurement is important. Radiation from any part of the aperture window is distributed uniformly over the whole detector surface. As a result any local nonuniformity of detector sensitivity does not introduce an error. The field lens also condenses the radiation onto a small detector which results in considerable optical gain and permits maximum detector sensitivity.

I claim:

1. A mechanical scanning device for operation in the infrared region comprising a radiation detector for transforming optical radiations into electrical signals; a field lens for evenly distributing said radiations over the whole detector surface; a pair of rotating discs at the focal plane of said device; motor means for driving said discs in the same direction at different speeds including a shaft connected to the faster turning disc directly from said motor means, gear reduction means connected to said shaft, and sleeve means surrounding said shaft and being connected to said gear reduction means and said slower turning disc to provide the slower turning rate; and aperture window which is shaped to provide a curved radial field of view adjacent to said faster turning disc; the faster turning disc being provided with a series of radial slots transparent to the optical radiation and spaced exactly the angular width of the aperture window; the slower disc being provided with a convolute slot transparent to the optical radiation, whereby the intersection of the two types of slots scans across said aperture window in a series of lines determined by the number of radial slots and the ratio of the speeds of the discs; and an objective lens for collecting the optical radiations in the field of view being scanned.

2. A device according to claim 1 in which the faster turning disc has ten slots and the slower turning disc is turned at one-tenth the speed of the fast disc.

3. A device according to claim 2 in which the radiation detector is a photomultiplier tube.

4. A device according to claim 1 in which the radiation detector is a photoconductor.

5. A device according to claim 1 in which the radiation detector is a high speed thermistor bolometer the thermistor being thin layers of a semiconductor element of the fourth group of the periodic system.

References Cited in the file of this patent

UNITED STATES PATENTS 1,801,756 Robb ---------------- Apr. 21, 1931